(12) United States Patent
Norris

(10) Patent No.: US 6,769,797 B1
(45) Date of Patent: Aug. 3, 2004

(54) AIRCRAFT LENS ATTACHMENT

(75) Inventor: Matthew Norris, Tulsa, OK (US)

(73) Assignee: The Nordam Group, Inc., Tulsa, OK (US)

( * ) Notice: Subject to any disclaimer, the term of this patent is extended or adjusted under 35 U.S.C. 154(b) by 13 days.

(21) Appl. No.: 10/324,446

(22) Filed: Dec. 20, 2002

(51) Int. Cl.[7] .............................................. F21V 17/04
(52) U.S. Cl. ........................................ 362/455; 362/470
(58) Field of Search ............................. 362/470, 455, 362/456, 459, 503, 255; 359/818, 819; 156/101, 102, 104, 221, 286, 222

(56) References Cited

U.S. PATENT DOCUMENTS

| | | | |
|---|---|---|---|
| 2,939,186 A | * | 6/1960 | Norwood et al. ............ 52/200 |
| 3,919,022 A | * | 11/1975 | Stefanik ..................... 156/104 |
| 4,029,953 A | | 6/1977 | Natoli |
| 4,419,722 A | | 12/1983 | Bury |
| 4,488,206 A | | 12/1984 | Mizusawa |
| 4,620,268 A | * | 10/1986 | Ferenc ....................... 362/517 |
| 4,674,014 A | | 6/1987 | Takatsuji et al. |
| 4,703,400 A | | 10/1987 | Vescio et al. |
| 5,154,505 A | | 10/1992 | Sasamoto |
| 5,366,577 A | | 11/1994 | Hart et al. |

* cited by examiner

Primary Examiner—Stephen Husar
Assistant Examiner—Hargobind S. Sawhney
(74) Attorney, Agent, or Firm—Doerner, Saunders, Daniel & Anderson; Chad M. Hinrichs

(57) ABSTRACT

An improved aircraft lens attachment system including a plurality of keyways in the lens, which intersect the edge of the lens and a resilient gasket with a plurality of keys located to correspond with the keyways of the lens, each keyway having an aperture passing through it. The improved lens attachment system eliminates the area of the lens, which is susceptible to fatigue cracking. It also provides a more flexible and efficient way to attach a lens to an aircraft.

11 Claims, 2 Drawing Sheets

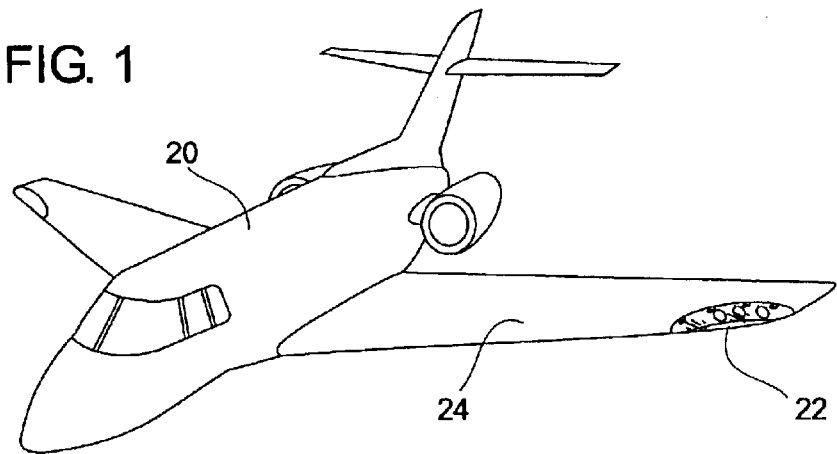
FIG. 1
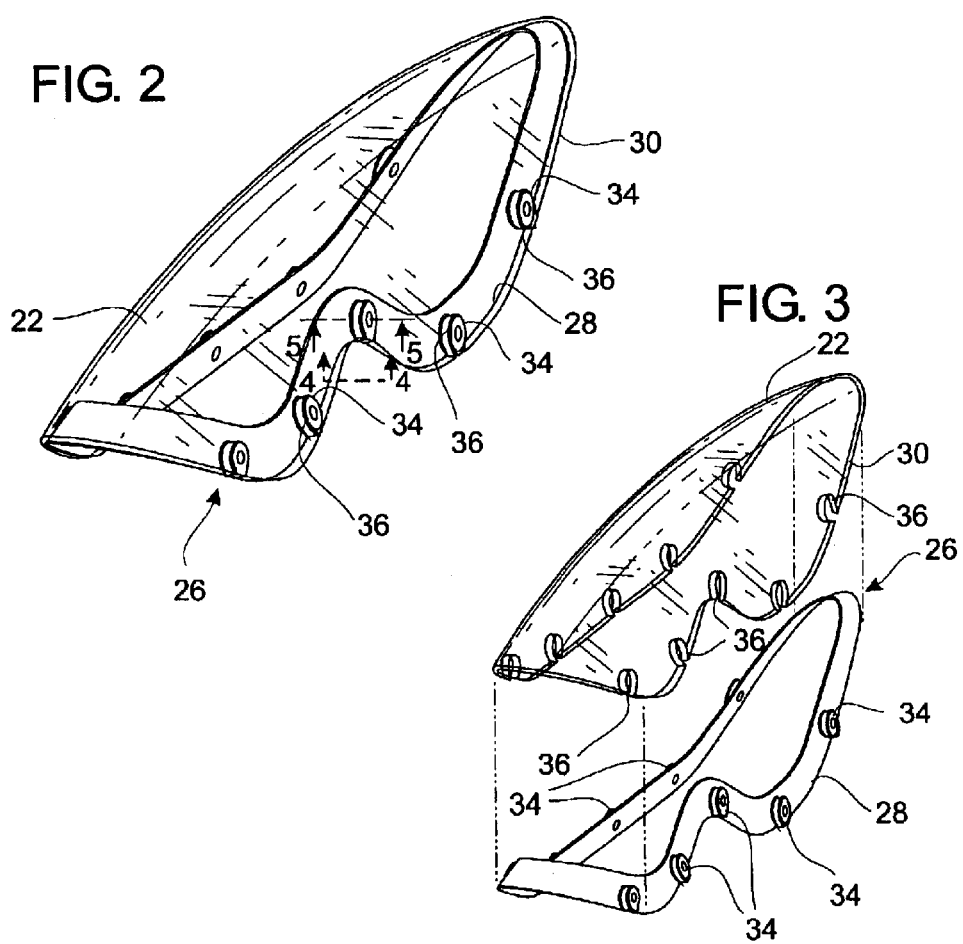
FIG. 2
FIG. 3

AIRCRAFT LENS ATTACHMENT

REFERENCE TO PENDING APPLICATIONS

This application is not related to any pending applications.

REFERENCE TO MICROFICHE APPENDIX

This application is not referenced in any microfiche appendix.

BACKGROUND OF THE INVENTION

1. Technical Field of the Invention

This invention relates to a lens attachment system for an aircraft

2. Prior Art

Navigational lights on aircraft are typically located along the leading edge of the wings. These lights are covered by a lens which is shaped to conform to the surface of the aircraft to which it is attached. Aircraft owners have historically had problems maintaining the lenses.

While in service, the lenses are exposed to extreme forces such as erosion from hail, sleet, sand and the like. The erosion deteriorates the translucent nature of the lens, thus reducing the effectiveness of the underlying lights.

Thermal expansion also contributes greatly to the failure of the lenses. The temperature range for the exterior of an aircraft can range from 110° F. at ground level on an airport tarmac to −60° F. at a cruising altitude of 30,000 feet. The problem of the wide temperature ranges is compounded by the fact that the coefficient of thermal expansion for a typical lens is approximately three times the coefficient of thermal expansion of aluminum, the primary material use for aircraft airframes. The repeated cycling of this thermal expansion causes the lenses to fail. The typical mode of failure is that the area between the bushing and the edge of the lens develops fatigue cracks.

Other factors contribute to this failure. Lenses are manufactured to the exact dimensions of the airplane as it was originally manufactured. However, once the airplane is flown, the exact dimensions are changed slightly by the forces exerted on the aircraft during flight. As such, a replacement lens will not precisely fit an aircraft. In order to replace that lens, the mechanic must exert additional forces on the lens in order to align the fastener holes and attach it to the airframe. This introduces residual stresses on the lens which further contribute to the fatigue of the lens.

The lenses must be constructed out of material which is capable of withstanding these extreme service conditions and residual stresses. The lenses have been known to be made out of polycarbonate, as well as acrylic. Other aircraft lens manufacturers have attempted to solve this fatigue cracking problem by reinforcing the edge of the lens with a fiberglass composite. However, this solution may introduce erosion problems, as well as adding unnecessary cost to the manufacturer of the lens.

U.S. Pat. No. 5,366,577 issued to Robert N. Hart and David M. Trebes on Nov. 22, 1994 discloses a method of manufacturing a lens for use as a part of an aircraft including the steps of fusion bonding a sheet of acrylic to a sheet of polycarbonate to form a sheet of laminate, cutting the laminate into a blank having a configuration required by the ultimate lens configuration, heating the blank and forming it around a mold to provide a three dimensional lens body of desired size and configuration having an uninterrupted circumferential edge and having an inner polycarbonate surface and an outer acrylic surface, applying a narrow strip seal to the lens body inner surface in a narrow strip portion adjacent substantially the full circumferential edge thereof in order to bond the strip seal to the lens body, shaping the circumferential edge of the lens body around substantially the full circumferential edge thereof, and providing bushings in the lens body and strip seal so the bushings are spaced around the circumferential edge as a means of securing the lens to an aircraft Even with these advances in materials and manufacturing methods failure of aircraft lenses remains a problem.

Another drawback to the lenses and lens attachment systems known in the field is the excessive amount of time it can take to install a lens cover. In order to attach the lens to the aircraft the fastener holes in the lens must be aligned with the fastener holes in the aircraft. As previously mentioned, this is complicated by the fact that the fastener holes in the lens are located according to the dimensions of the original design. The actual dimensions of the fastener holes of the aircraft are altered from the dimensions of the original design due to the forces exerted on the aircraft while in flight. The end result is that these two sets of fastener holes do not always align properly. The problem is further complicated by the gasket. The holes in the gasket must also be aligned with the corresponding fastener holes in the lens in aircraft. As can be seen, this can become a very labor intensive repair.

SUMMARY OF THE INVENTION

The present invention solves the problem of fatigue cracking in aircraft lenses by using a unique and novel lens attachment system. It is an objective of the present invention to provide a lens attachment system capable of absorbing some of the thermal and residual stresses inherent with replacement aircraft lens.

It is also an objective of the present invention to provide a lens attachment system which will reduce the amount of time necessary to replace an aircraft lens.

The lens attachment system of the present invention is comprised of a plurality of keyways intersecting the edge of the lens which eliminate the area susceptible to cracking. A gasket comprised of a resilient material is then used to secure the lens to the airframe. The gasket has a plurality of keys which correspond to the keyways of the lens. The gasket and lens are then attached to the airframe by a plurality of fasteners which extend through the keys.

The lens is attached to the aircraft through the interference of the keys with the keyways. The gasket and keys are made of a resilient material. The resiliency of the gasket and keys allows more flexibility when attaching the lens to the aircraft. This flexibility cases the alignment process of the fastener holes.

A better understanding of the invention will be obtained from the attached specification, drawings and claims.

BRIEF DESCRIPTION OF THE INVENTION

FIG. 1 is a perspective view of an aircraft with a lens cover.

FIG. 2 is a perspective view of a lens cover incorporating one embodiment of the present invention.

FIG. 3 is an exploded view of a lens cover incorporating one embodiment of the present invention.

DETAILED DESCRIPTION OF THE PREFERRED EMBODIMENT

Figure 4:
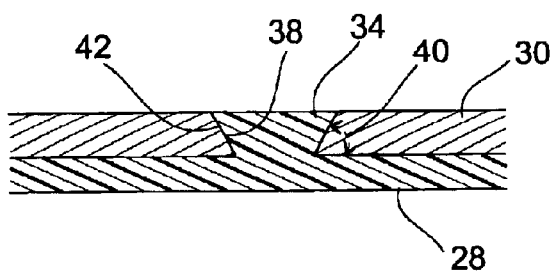
FIG. 4 is an end view of a lens and gasket incorporating one embodiment of the present invention.

FIG. 1 is a perspective view of an aircraft 20. A lens 22 protects navigational lights, as well as lights used for visibility while taxiing and takeoff and landing. The lens 22 is made of a translucent material capable of withstanding the temperature changes, erosion and other forces exerted on it during service. Any of the materials commonly used for aircraft lenses can be used such as, but not limited to, acrylic, polycarbonate or composites.

FIG. 2 is a prospective view of the lens cover 22 with the preferred embodiment of the present invention.

FIG. 3 shows an exploded view of the lens cover 22 and the lens attachment system 26 incorporating the present invention. The lens attachment system 26 is comprised of a gasket 28 extending along the edge 30 of the lens body 32. The gasket 28 has a plurality of keys 34. The lens attachment system 26 also includes a plurality of keyways 36 cut into the lens 22 such that the keyway 36 intersects the edge 30 of the lens 22.

Figure 5:
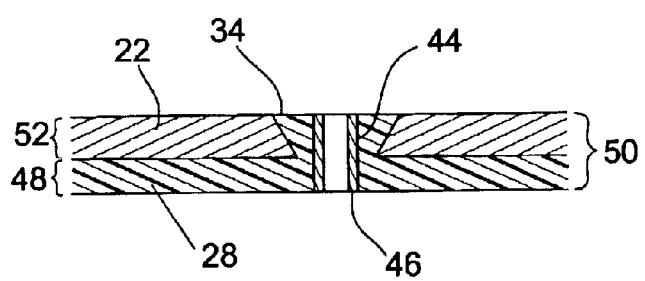
FIG. 5 is a sectional view of a key and keyway incorporating one embodiment of the present invention.

FIG. 4 is an end view of the key 34 and keyway 36 as indicated in FIG. 2. FIG. 5 is a cross section of the key 34 and keyway 36 from the line indicated in FIG. 2. The side 38 of the key 34 is at an angle 40 to the gasket 28. The angle 40 can vary, however, in the preferred embodiment the angle 40 is 80 degrees. The side 42 of the keyway 36 is chamfered or cut at an angle to compliment the angle 40. The pressure exerted by the side of the key 34 onto the side 42 of the keyway 36 of the lens 22 helps maintain the lens 22 in place on the aircraft 20.

FIG. 5 shows a cross sectional view of the lens 22, gasket 28, key 34 and keyway 36. There is an aperture 44 passing through the key 34. When the lens 22 is installed on the aircraft 20, a fastener passes through the aperture 44 to secure the lens 22 and gasket 28 onto the aircraft 20. Any type of fastener commonly used in the field including but not limited to screws, bolts and rivets could be used with the present invention.

In the preferred embodiment of the present invention, as shown in FIG. 5, the aperture 44 is lined with a bushing 46. The bushing 46 transfers any force created by the installation of the fastener directly to the aircraft 20. This prevents that force from distorting the gasket 28 or lens 22. The bushing 46 can be made out of any material commonly used for bushings including but not limited to aluminum and aluminum alloys. It should be noted that in alternate embodiments of the present invention it may be possible to use the present invention without a bushing 46.

The gasket 28 and keys 34 can be made out of any resilient material, including but not limited to, polyester TPE, chlorosulfanated polyethylene rubber, polybutadiene rubber, melt processable rubber and PEBA. However, in the preferred embodiment, the applicant has found silicon elastomer with durometer hardness Shore A 80+/−5, which is the preferred material for the gasket 28 and keys 34.

As indicated in FIG. 5, the thickness 48 of the preferred embodiment of the gasket 28 is approximately 0.04 inches. The thickness 50 of the preferred embodiment of the key 34 is approximately 0.25 inches. These two thicknesses are based upon the lens 22 having a thickness 52 of approximately 0.21 inches. It should be noted that the actual thicknesses of the lens 22, gasket 28 and key 34 can vary greatly while still being within the scope of the present invention.

Figure 6:
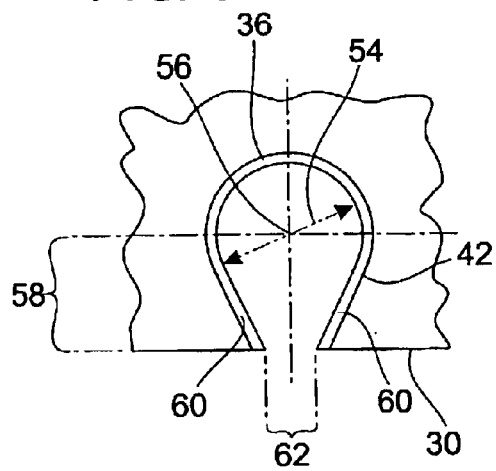
FIG. 6 is a top view of the preferred embodiment of the keyway.

FIG. 6 shows a top view diagram of the preferred embodiment of the keyway 36. The keyway 36 has a circular portion with a diameter 54 of 0.7 inches. The center 56 of the circular portion of the keyway 36 is located a distance 58 of 0.4342 inches from the edge 30 of the lens 22. In the preferred embodiment, the keyway 36 has a straight portion 60 running tangentially from the circular portion of the keyway 36 out to the edge 30 of the lens 22, thus creating an open gap 62 the edge 30 of the lens 22. In the preferred embodiment, the gap is approximately 0.3 inches wide. It should be noted that the geometry and dimensions of the key 34 and keyway 36 can vary greatly while still being within the scope of the present invention.

Figure 7:
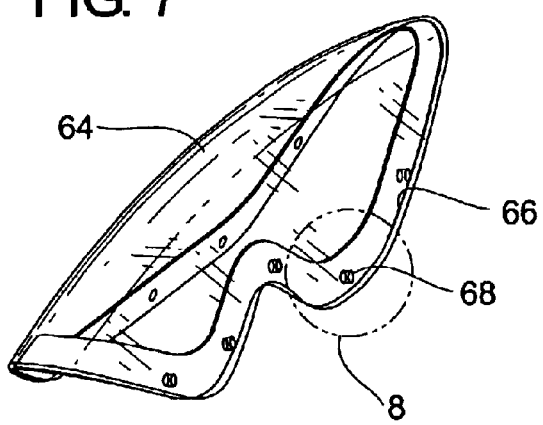
FIG. 7 is a top view of a prior art lens and lens attachment system.
Figure 8:
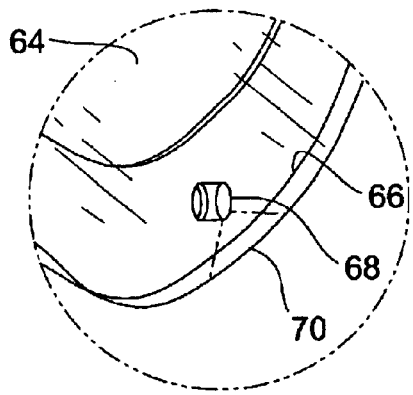
FIG. 8 is a close-up top view of a lens using the prior art lens attachment system.

FIG. 7 is a perspective view of a prior art lens 64 and prior art lens attachment system. The prior art lens attachment system has a gasket 66 and a plurality of fastener holes 68. FIG. 8 is a close-up of the edge of the prior art lens 64. The shaded area 70 shown in between the fastener hole 68 and the edge of the prior art lens 64 is the area of the prior art lens 64 which is susceptible to fatigue cracking.

The foregoing specifications and drawings are only illustrative of the preferred embodiments of the present invention. They should not be interpreted as limiting the scope of the attached claims. Those skilled in the arts will be able to come up with equivalent embodiments of the present invention without departing from the spirit and scope thereof.

What is claimed is:

1. A lens attachment system for aircraft comprising:

a lens having an edge extending along the periphery of the lens;

a plurality of keyways extending through the lens and intersecting the edge of the lens;

the keyways having a chamfered side;

a gasket having a plurality of keys, the gasket sized to extend along the edge of the lens and the keys are located to correspond to the keyways;

the keys having a side that is at an angle which compliments the chamfered side of the keyways; and an aperture passing through the keys.

2. A lens attachment system as claimed in claim 1, wherein the gasket is comprised of a resilient material.

3. A lens attachment system as claimed in claim 2, wherein the gasket is comprised of polyester TPE.

4. A lens attachment system as claimed in claim 2, wherein the gasket is comprised of silicon elastomer.

5. A lens attachment system as claimed in claim 2, wherein the gasket is comprised of cholorosulfanated polyethylene rubber.

6. A lens attachment system as claimed in claim 2, wherein the gasket is comprised of polybutadiene rubber.

7. A lens attachment system as claimed in claim 2, wherein the gasket is comprised of melt process rubber.

8. A lens attachment system as claimed in claim 1, wherein the apertures passing through the keys are lined with a bushing.

9. A lens attachment system as claimed in claim 8, wherein the bushing is comprised of an aluminum alloy.

10. A lens attachment system as claimed in claim 8, wherein the bushing is comprised of aluminum.

11. A lens attachment system for aircraft comprising:

a lens having an edge extending along the periphery of the lens;

a plurality of keyways extending through the lens and intersecting the edge of the lens;

the keyways having an 80 degree chamfered side;

a resilient gasket sized to extend along the edge of the lens and having a plurality of keys located to correspond to the keyways;

each key having a side that is at an 80 degree angle to the gasket;

an aperture passing through the keys; and a bushing lining the aperture.

\* \* \* \* \*